(12) United States Patent
Anderson

(10) Patent No.: US 6,935,115 B2
(45) Date of Patent: Aug. 30, 2005

(54) CONTROLLING AIRFLOW TO MULTIPLE ENGINE MODULES WITH A SINGLE THROTTLE BODY

(75) Inventor: Donald D Anderson, Ann Arbor, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/738,674

(22) Filed: Dec. 17, 2003

(65) Prior Publication Data

US 2005/0126173 A1  Jun. 16, 2005

Related U.S. Application Data

(60) Provisional application No. 60/526,555, filed on Dec. 3, 2003.

(51) Int. Cl.$^7$ .......................... F02B 73/00; F02B 75/04; F02B 75/22; F02D 25/04; F02D 17/02
(52) U.S. Cl. .......................... 60/698; 60/716; 60/718; 123/DIG. 8; 477/2; 477/6
(58) Field of Search .......................... 60/698, 716, 718; 123/198 F, DIG. 8; 477/2, 6

(56) References Cited

U.S. PATENT DOCUMENTS

| | | | | |
|---|---|---|---|---|
| 4,417,551 A | * | 11/1983 | Kronogard et al. .... | 123/DIG. 8 |
| 4,470,379 A | * | 9/1984 | Miyakoshi et al. .... | 123/DIG. 8 |
| 4,957,072 A | * | 9/1990 | Goldowsky ............ | 123/DIG. 8 |
| 5,003,935 A | * | 4/1991 | Goldowsky ............ | 123/DIG. 8 |
| 6,306,056 B1 | | 10/2001 | Moore .......................... | 477/2 |
| 6,474,068 B1 | | 11/2002 | Abdel Jalil et al. ........... | 60/698 |
| 6,694,948 B2 | * | 2/2004 | Glugla et al. ............ | 123/198 F |

FOREIGN PATENT DOCUMENTS

FR   2491147 A  *  4/1982  ........... F02B 73/00

* cited by examiner

*Primary Examiner*—Sheldon J Richter
(74) *Attorney, Agent, or Firm*—Thomas A. Jurecko

(57) ABSTRACT

A multi-engine power plant, includes a first internal combustion engine module having an air intake and an output shaft for delivering power, a second internal combustion engine module having an air intake and an output shaft for delivering power, and a single throttle body operatively connected to the air intakes of both the first and second engine modules, for controlling a flow of air to the intakes of the engine modules at a common manifold absolute pressure (MAP) of both engine modules during operation of one or both of the engine modules. The power plant also includes a selectively engagable clutch for operatively coupling the output shaft of the second engine module to the output shaft of the first engine module, to thereby produce a common torque output from the first and second engine modules.

25 Claims, 4 Drawing Sheets

CONTROLLING AIRFLOW TO MULTIPLE ENGINE MODULES WITH A SINGLE THROTTLE BODY

RELATED APPLICATION(S)

This application claims the benefit of Provisional Patent Application Ser. No. 60/526,555, filed Dec. 3, 2003.

TECHNICAL FIELD OF THE INVENTION

This invention relates to multi-engine power plants, for both mobile and stationary applications, and more particularly to power plants having multiple internal combustion engine modules that are selectively coupled together to provide a combined output torque.

BACKGROUND AND SUMMARY OF THE INVENTION

Power plants, such as automotive or marine engines, and engines driving stationary electrical generators or pumps, for example, are often required to operate over a wide range of output torque. An automobile engine, for example, must provide a significant amount of torque for accelerating the automobile from rest to a cruising speed. Once the automobile has reached the cruising speed, substantially less torque is generally required for maintaining the cruising speed. An engine that produces sufficient power for rapidly accelerating an automobile will generally be larger than would be required for maintaining cruising speed, and will operate inefficiently when throttled back to produce only the power required for maintaining the desired cruising speed. A stationary power plant driving a generator presents a similar challenge when electrical loads are imposed on, and removed from the generator.

One approach to improving the efficiency of power plants used in such applications is to utilize multi-engine power plants, having two or more engines, or two or more engine modules, with output shafts that are selectively coupled together when the demand for output torque is high, such as during acceleration of an automobile. Once a steady state condition is reached, and the torque requirement is reduced, such as during steady speed cruising of an automobile, the second engine is decoupled, and may actually be shut down to improve efficiency of the power plant. Commonly assigned U.S. Pat. No. 6,306,056 B1, to Moore, and U.S. Pat. No. 6,474,068 B1, to Abdel Jalil, et al, describe methods and apparatus for operating multi-engine power plants in this manner.

Both Moore, and Abdel Jalil, disclose individually controlling airflow to separate internal combustion engines of a multi-engine power plant. This approach works well, and is consistent with state of the art beliefs, as held by those having skill in the art, that airflow to each engine must be controlled with a separate throttle body, in order to achieve proper operation and torque sharing of the engines. It has been commonly accepted by those having skill in the art that a separate throttle body was required for each engine in a multi-engine power plant, to control the speed of an engine during the period of time when that engine was being started, so that the engine speed would not run away while the engine was being started and brought up to an operating speed that matched the speed of other engines in the power plant that were already running.

The inventor of the present invention has discovered, however, that in a multi-engine power plant, including a first internal combustion engine module having an air intake and an output shaft for delivering power, and a second internal combustion engine module having an air intake and an output shaft for delivering power, air flow can be controlled to the intakes of the engine modules at a common manifold absolute pressure (MAP) of both engine modules, during operation of one or both of the engine modules, with a single throttle body operatively connected to the air intakes of both the first and second engine modules.

By using only a single throttle body for controlling airflow to two or more engine modules of a multi-engine power plant, a number of duplicate components, that were required in prior multi-engine power plants, can be eliminated. The complexity, cost, weight and size of a power plant according to the invention are all reduced, and reliability is improved, in comparison to prior multi-engine power plants.

In one form of the invention, an apparatus for controlling a multi-engine power plant includes a single throttle body, and a controller operatively connected to the throttle body for controlling a flow of air through the throttle body. The throttle body includes an inlet for receiving a flow of air, and an outlet operatively connected to the air intakes of both a first and a second engine module for delivering the flow of air to the intakes of the engine modules at a common manifold absolute pressure (MAP) of both engine modules during operation of one or both of the engine modules. The apparatus may further include an inlet manifold defining a common internal plenum, having an inlet for receiving the flow of air from the throttle body, a first outlet for delivering a portion of the flow of air from the common internal plenum to the intake of the first engine module, and a second outlet for delivering a remainder of the flow of air from the common internal plenum to the intake of the second engine module.

A multi-engine power plant, according to the invention may include a first internal combustion engine module having an air intake and an output shaft for delivering power, a second internal combustion engine module having an air intake and an output shaft for delivering power, and a single throttle body operatively connected to the air intakes of both the first and second engine modules, for controlling a flow of air to the intakes of the engine modules at a common manifold absolute pressure (MAP) of both engine modules during operation of one or both of the engine modules. The power plant may also include a selectively engagable clutch for operatively coupling the output shaft of the second engine module to output shaft of the first engine module, to thereby produce a common output torque from the first and second engine modules.

In an apparatus or method, according to the invention, a flow of fuel to the first engine module may be controlled independently from a flow of fuel to the second engine module, and a flow of fuel to the second engine module may be controlled independently from a flow of fuel to the first engine module. Ignition in the first engine module may also be controlled independently from ignition in the second engine module, and ignition in the second engine module may be controlled independently from ignition in the first engine module. The flow of air through the throttle body may be controlled as a function of a desired torque output of the power plant.

The output shaft of the second engine module may be selectively operatively connected to the output shaft of the first engine module. The flow of air through the throttle body may be controlled as a function of whether the output shaft of the second engine module is operatively coupled to the output shaft of the first engine module. The output shaft of the second engine module may be selectively operatively connected to the output shaft of the first engine module, as a function of the desired torque output of the power plant.

The flow of air through the throttle body may be controlled according to a first function of desired torque output from the power plant when only the first engine module is operating, and controlled according to a second function of desired torque output when both the first and second engine modules are operating. When the speed of the output shaft of the second engine module does not substantially match the speed of the output shaft of the first engine module, as would be the case when the first engine module was operating but the second engine module was only idling or being started, for example, the throttle body may be controlled according to a third function of desired torque output from the power plant. The second engine module may also be started, by coupling its output shaft to the output shaft of the first engine module, while the first engine module is operating, and controlling the throttle body according to the third function of desired torque while the second engine module is being started.

The foregoing and other features and advantages of the invention will become further apparent from the following detailed description of exemplary embodiments, read in conjunction with the accompanying drawings. The detailed description and drawings are merely illustrative of our invention rather than limiting, the scope of the invention being defined by the appended claims and equivalents thereof.

Figure 1:
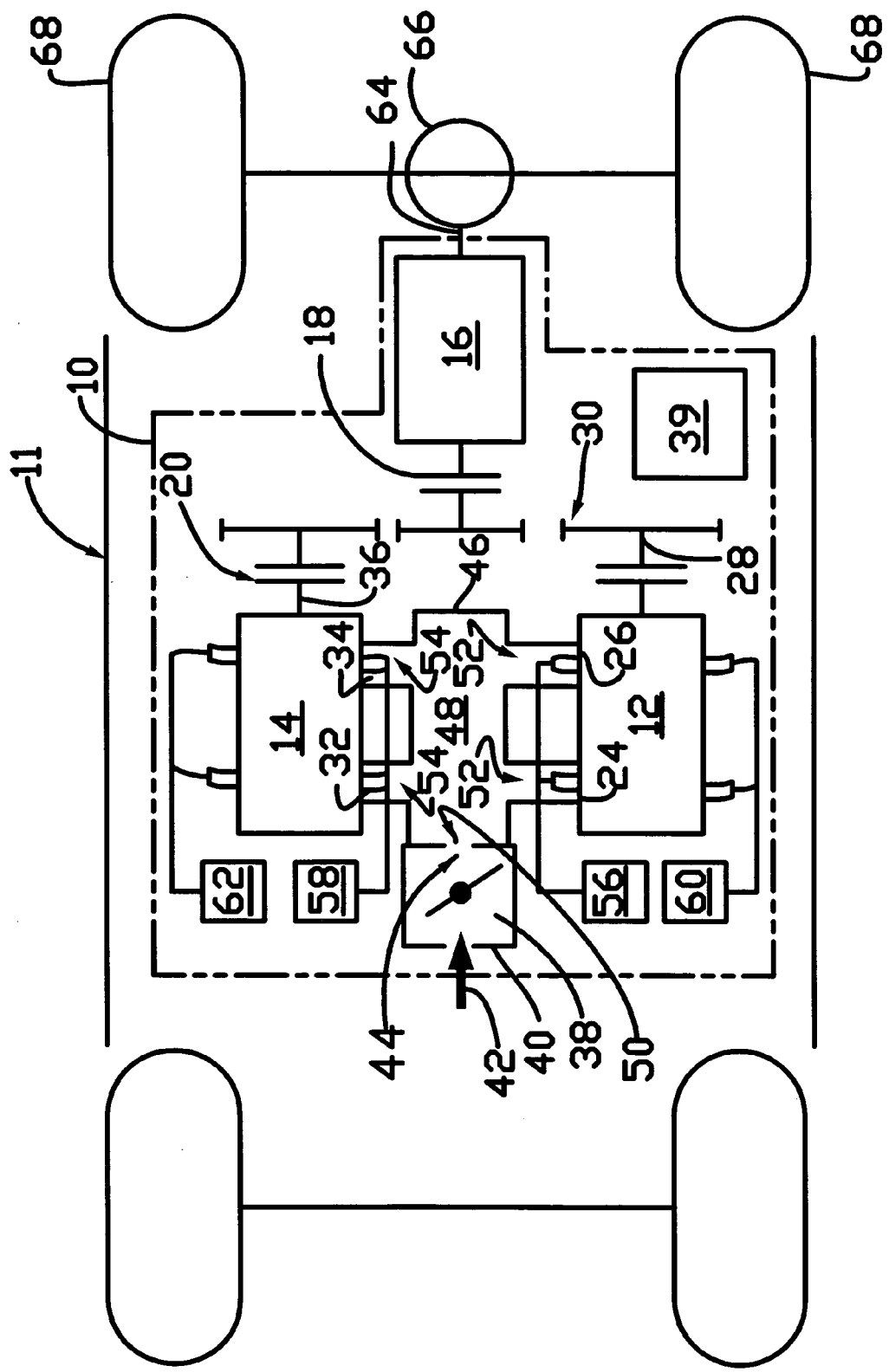
FIG. 1 is a schematic representation of a first exemplary embodiment of a multi-engine power plant, according to the invention, installed in a wheeled vehicle.

Throughout the following description of exemplary embodiments of the invention, components and features that are substantially equivalent or similar will be identified in the drawings by the same reference numerals. For the sake of brevity, once a particular element or function of the invention has been described in relation to one exemplary embodiment, the description and function will not be repeated for elements that are substantially equivalent or similar in form and/or function to the components previously described, in those instances where the alternate exemplary embodiments will be readily understood by those skilled in the art from a comparison of the drawings showing the various exemplary embodiments in light of the description of a previously presented embodiment.

DETAILED DESCRIPTION

FIG. 1 shows a first exemplary embodiment of a multi-engine power plant 10, according to the invention, installed in a vehicle 11. The power plant 10 includes a first internal combustion engine module 12, a second internal combustion engine module 14, a transmission 16, a first selectively engagable clutch 18, and a second selectively engagable clutch 20. The first and second engine modules 12, 14 of the first exemplary embodiment are schematically illustrated as two cylinder reciprocating piston engine modules, but the invention may be practiced with a first and a second engine module 12, 14 having more or fewer cylinders. It is also not necessary that the first and second engine modules 12, 14 have the same number of cylinders.

The first engine module 12 includes a pair of air intakes 24, 26, one for each of the two cylinders of the first engine module 12, and an output shaft 28 for delivering a torque output from the first engine module 12 to the transmission 16, via a gear train 30 and the first clutch 18, operatively connecting the output shaft 28 of the first engine module 12 to the transmission 16. The second internal combustion engine module 14 includes a pair of air intakes 32, 34, one for each of the two cylinders of the second engine module 14, and an output shaft 36 for delivering a torque output of the second engine module 14 to the gear train 30 via the second clutch 20, or for receiving a torque input from the second clutch 20 during starting of the second engine module 14 in the manner described below.

The first exemplary embodiment of the power plant 10 also includes a single throttle body 38, a controller 39, and an intake manifold 46, which together comprise an apparatus for controlling the multi-engine power plant 10.

The single throttle body 38 includes an inlet 40, for receiving a flow of air as indicated by arrow 42, and an outlet 44 operatively connected to the air intakes 24, 26, 32, 34, of both the first and second engine modules 12, 14, for delivering the flow of air 42 to the intakes 24, 26, 32, 34 of the engine modules 12, 14 at a common manifold absolute pressure (MAP) of both engine modules 12, 14 during operation of one or both of the engine modules 12, 14. The controller 39 is operatively connected, in a manner described in more detail below, to the throttle body 38 for controlling the flow of air 42 through the throttle body 38.

The inlet manifold 46 defines a common internal plenum 48 having an inlet 50 for receiving the flow of air 42 from the throttle body 38, a pair of first outlets 52 for delivering a portion of the flow of air 42 from the common internal plenum 48 to the intakes 24, 26 of the first engine module 12, and a pair of second outlets 54 for delivering a remainder of the flow of air 42 from the common internal plenum 48 to the intakes 32, 34 of the second engine module 14.

As will be understood by those having skill in the art, the mass flow of air 42 entering the power plant 10 is controlled by adjusting the degree to which the throttle body 38 internally restricts the mass flow of air 42 passing through the throttle body 38. As the mass flow of air 42 is drawn through the throttle body 38, the adjustable internal restriction in the throttle body 38 unavoidably causes the air to accelerate within the throttle body 38. Accelerating the air through the throttle body causes the absolute pressure of the flow of air 42 to drop, in a manner known in the art, so that the pressure of the air inside the internal plenum 48 of the intake manifold 46 is below atmospheric pressure.

The degree to which the flow of air 42 is restricted by the throttle body 38 is reflected in the absolute pressure within the internal plenum 48 of the manifold 46, as measured at the inlet 50 of the intake manifold 46. This absolute pressure is know in the industry as the manifold absolute pressure (MAP), and is calculated by adding the atmospheric pressure to the gage pressure of the air inside of the internal plenum 48. As is well known in the art, the MAP can be measured directly with a sensor, and is commonly used for controlling fuel flow and ignition in engine modules utilizing throttle bodies for regulating the mass flow of air entering an engine module.

Those having skill in the art will recognize that in a power plant 10 according to the invention, because the internal plenum 48 is common to both engine modules 12, 14, and because the intakes 24, 26, 32, 34 of both engine modules 12, 14 are connected directly to the common internal plenum 48, the MAP of both engine modules 12, 14 will be the same at all times, regardless of whether both engine modules 12, 14 are running or only the first engine module 12 is running.

The power plant 10 of the first exemplary embodiment also includes a first fuel control system 56, in the form of a conventional multi-point fuel injection system, operatively connected to the first engine module 12 for controlling a flow of fuel to the first engine module 12 independently from a flow of fuel to the second engine module 14. A second fuel control system 58, also in the form of a conventional multi-point fuel injection system, is operatively connected to the second engine module 14 for controlling a flow of fuel to the second engine module 14 independently from a flow of fuel to the first engine module.

A first ignition control system 60 is operatively connected to the first engine module 12 for controlling ignition in the first engine module 12 independently from ignition in the second engine module 14. A second ignition control system 62 is operatively connected to the second engine module 14 for controlling ignition in the second engine module 14 independently from ignition in the first engine module 12.

The transmission 16 includes an output shaft 64 connected through a differential 66 for providing torque to a pair of drive wheels 68 of the vehicle 11. The invention is applicable to vehicles utilizing front wheel drive, rear wheel drive, and all wheel drive. Those having skill in the art will further recognize that the invention may be practiced in many forms, within the scope of the appended claims, and will find utility in applications including but not limited to wheeled vehicles having more or less wheels than the exemplary embodiment, boats, stationary installations, and airborne power plants.

Figure 2:
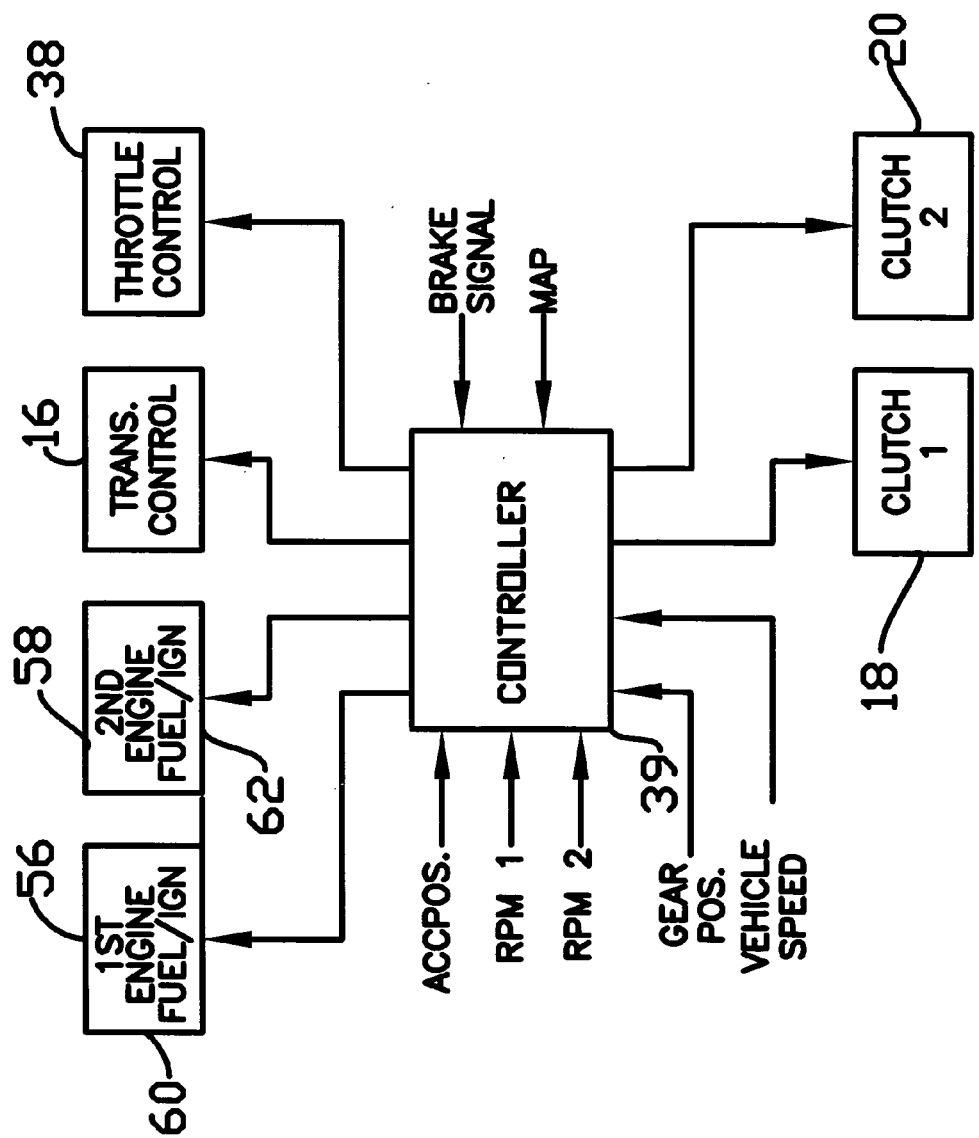
FIG. 2 is a schematic representation of a controller of the power plant of FIG. 1.

As shown in FIG. 2, the controller 39 of the exemplary embodiment is adapted for receiving an accelerator pedal position input ACCPOS from an accelerator pedal (not shown) of the vehicle 11, indicating a desired torque output of the power plant 10, and controls the flow of air 42 through the throttle body 38 as a function of the desired torque output. In other embodiments of the invention, a throttle lever, an automatic control, or any other appropriate means, may be used in place of an accelerator pedal for providing the signal indicating the desired torque output.

The controller 39 of the exemplary embodiment also receives a number of other signals, as shown in FIG. 2, including MAP, the rotational speeds RPM 1, RPM 2 of the output shafts 28, 36 of the first and second engine modules 12, 14, VEHICLE SPEED, a BRAKE SIGNAL indicating that the vehicle operator desires to slow or stop the vehicle 11, and a signal GEAR POS indicating which gear the vehicle is operating in for transmissions having multiple or variable gear ratios. The controller 39 may also receive other inputs, which are customary and/or necessary for operation of the power plant 10 and vehicle 11.

A typical operational scenario for the exemplary embodiment of the power plant 10 and vehicle 11 is as follows. The first engine module 12 is started, with the controller 39 controlling the flow of air 42 through the throttle body 38 according to a first function of desired output torque. The first function is primarily applicable to operation with only the first engine module 12 running. The transmission 16 is put in gear, and the first clutch 18 is engaged to connect the output shaft 28 of the first engine module 12 to the transmission 16, via the gear train 30, for driving the vehicle 11 with power supplied only by the first engine module 12. As the desired output torque changes, as indicated by the ACCPOS signal, the controller 39 controls the airflow 42 through the throttle body 38 in accordance with the first function of desired torque output, and also controls the first fuel system 56 and first ignition system 60 to control fuel injection and ignition timing for the first engine module 12.

If it is necessary to operate both engine modules 12, 14 to produce the desired output torque, the controller 39 will control the airflow 42 through the throttle body 38 in accordance with a second function of desired torque output, while both engine modules 12, 14 are running, and will also control the second fuel system 58 and the second ignition system 62 to control fuel injection and ignition timing for the second engine module 14.

If possible, the power plant 10 and vehicle 11 are operated with only the first engine module 12 running, to conserve fuel. If operating conditions should develop that require a greater torque output than the first engine module 12 can provide, however, the controller 39 engages the second clutch 20, while the first engine module 12 is running, to operatively couple the output shaft 36 of the second engine module 14 to the output shaft 28 of the first engine module 12, so that the first engine module 12 can function as a starter motor for accelerating the second engine module 14 up to operating speed.

As the second engine module 14 is brought up to speed, it will not be adding torque output to the gear train 30, but will rather be receiving torque from the gear train 30, generated either by the first engine module 12 or by inertia in the gear train 30 caused by rotation of the rear wheels 68 as the vehicle rolls along a driving surface. During the period of time that the second engine module 14 is being started, and until the speed of the output shaft 36 of the second engine module 14 substantially matches the speed of the output shaft 28 of the first engine module 12, the controller 39 will control the airflow 42 through the throttle body 38 according to a third function of the desired torque output, and will also control the second fuel and ignition systems 58, 62 in an appropriate manner, as the second engine module 14 accelerates to a speed at which the speed (RPM 2) of the second engine module 14 substantially matches the speed (RPM 1) of the first engine module 12.

Once the speed of the second engine module 14 substantially matches the speed of the first engine module 12, the controller 39 switches to controlling the flow of air 42 through the throttle body according to the second function of desired torque output. If the desired torque output should drop low enough that the desired torque output can be provided by the first engine module 12 alone, the controller 39 will shut down the second engine module 14 and disengage the second clutch 20, to improve fuel efficiency of the power plant 10.

The three functions of desired torque output, and separate control of the fuel and ignition of the first and second engine modules 12, 14 are utilized to compensate for the fact that, although the MAP will always be the same, by virtue of the construction required by the invention, the engine modules 12, 14 will be operating at different speeds RPM 1, RPM 2 at any time that the engine modules are not solidly coupled together by the second clutch 20, and the fact that the flow of air 42 required for operation of the power plant 10 will differ, dependent upon whether one or both engine modules 12, 14 are running.

Several alternate approaches are contemplated for starting the second engine module 14, in accordance with the procedure discussed above. In a first approach, the second clutch 20 is fully engaged, and left in a fully engaged state, as the second engine module 14 is started. In a second approach, known as a "bump-start," the second clutch 20 is momentarily engaged to spin the second engine module 14 up to a self-sustaining speed. The second clutch 20 is then partially disengaged, and the second engine module 14 is allowed to drive itself up to an operating speed where the speed of the second engine module 14 will substantially match the speed of the first engine module 12, and then the second clutch 20 is re-engaged to couple the torque outputs of the first and second engine modules 12, 14 together to produce the desired torque output of the power plant 10.

During run-up of the second engine module 14 the second clutch 20 may be partly engaged and/or slipped, or engaged and disengaged rapidly several times, for preventing the speed of the second engine module 12 from running away. By controlling the second clutch 20 in this manner, the throttle body 38 can be operated in a wide open throttle (WOT) mode during start of the second engine module 14, and the speeds of both the first and second engine modules 12, 14 can be controlled without resorting to the use of a separate throttle body for each engine module 12, 14 as was previously believed to be necessary by those having skill in the art.

Utilizing a bump-start, or partial/slipping engagement of the second clutch 20 in the manner described above, during start of the second engine module 14, also provides an additional advantage of minimizing the reduction in output torque from the first engine module 12 that remains available for maintaining vehicle speed during start of the second engine module 14. In a controller 39, as shown in FIG. 2, having a number of input signals indicating engine speed for both engine modules, vehicle speed, which gear the transmission is operating in when the start is needed, and the desired torque signal, the controller 39 can effect start and shutdown of the second engine module 14 in a smooth manner resulting in an essentially imperceptible change in output torque from the power plant 10 as it makes the transition from operation with one or both engine modules 12, 14.

Figure 3:
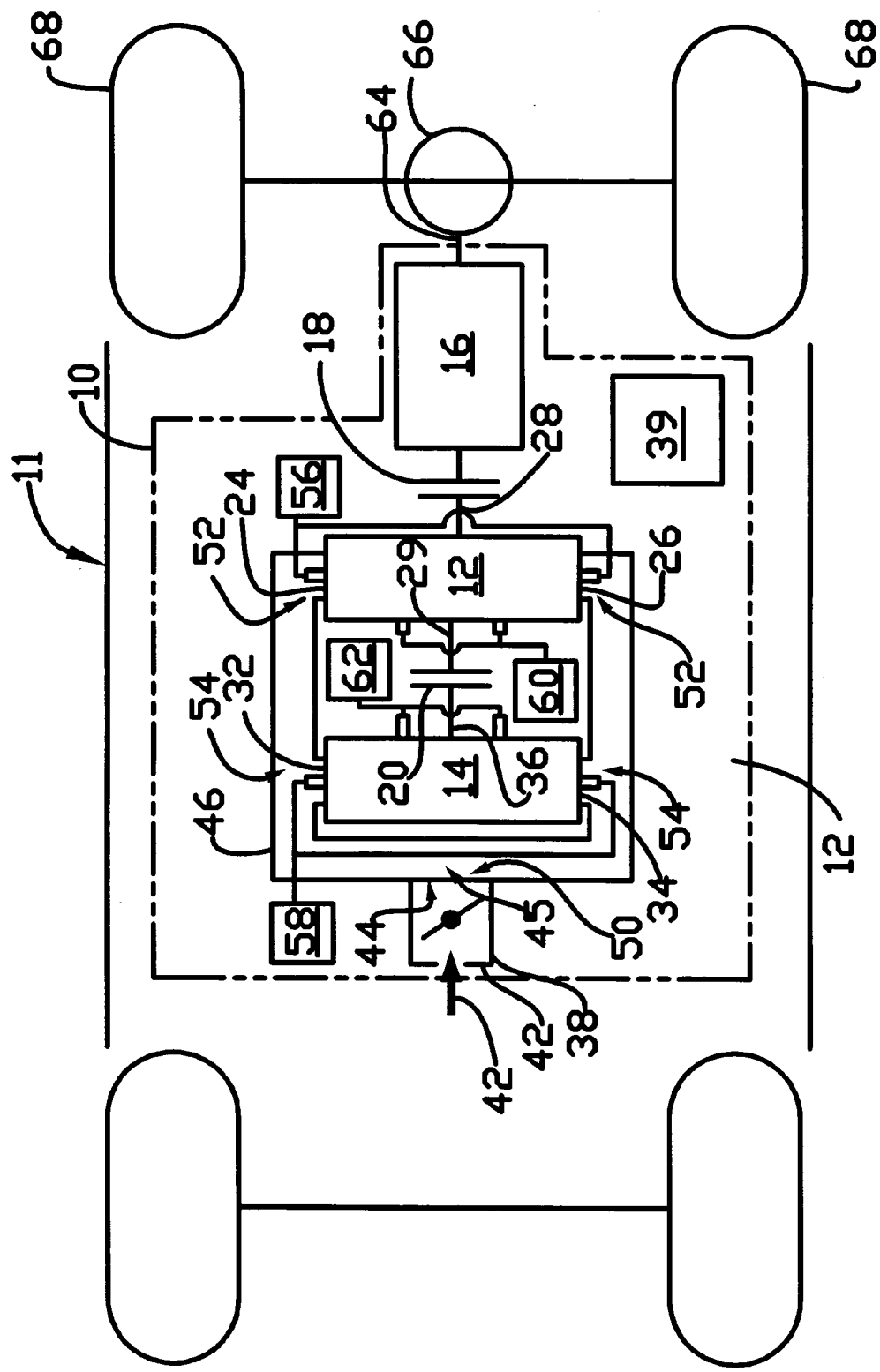
FIG. 3 is a schematic representation of a second exemplary embodiment of a multi-engine power plant, according to the invention, installed in a wheeled vehicle.

FIG. 3 shows a second exemplary embodiment of the invention that is identical to the first exemplary embodiment described above in relation to FIGS. 1 and 2, except that the gear train 30 is eliminated and the torque outputs of first and second engine modules 12, 14 are coupled together by the second clutch 20 in a series arrangement rather than in the parallel arrangement of the first exemplary embodiment. This embodiment provides a power plant 10 that is generally more compact and that requires fewer drive train components than the power plant 10 of the first exemplary embodiment. Operation of the second embodiment of the invention is identical to the operation of the first embodiment as described above.

The output shaft 28 of the first engine module 12 in the second exemplary embodiment includes an input/output end 29 that is attached to the second clutch 20, for either receiving torque from, or delivering torque to, the output shaft 36 of the second engine module 14 directly through the second clutch 20. This arrangement allows the gear train 30 of the first embodiment to be eliminated, but requires that the output shaft 28 of the first engine module 12 be sized for transmitting the combined torque output of both the first and second engine modules 12, 14.

Those skilled in the art will also readily recognize that, while the embodiments of the invention disclosed herein are presently considered to be preferred, various changes and modifications can be made without departing from the spirit and scope of the invention. For example, the invention can be used in power plants having more than two engine modules.

Figure 4:
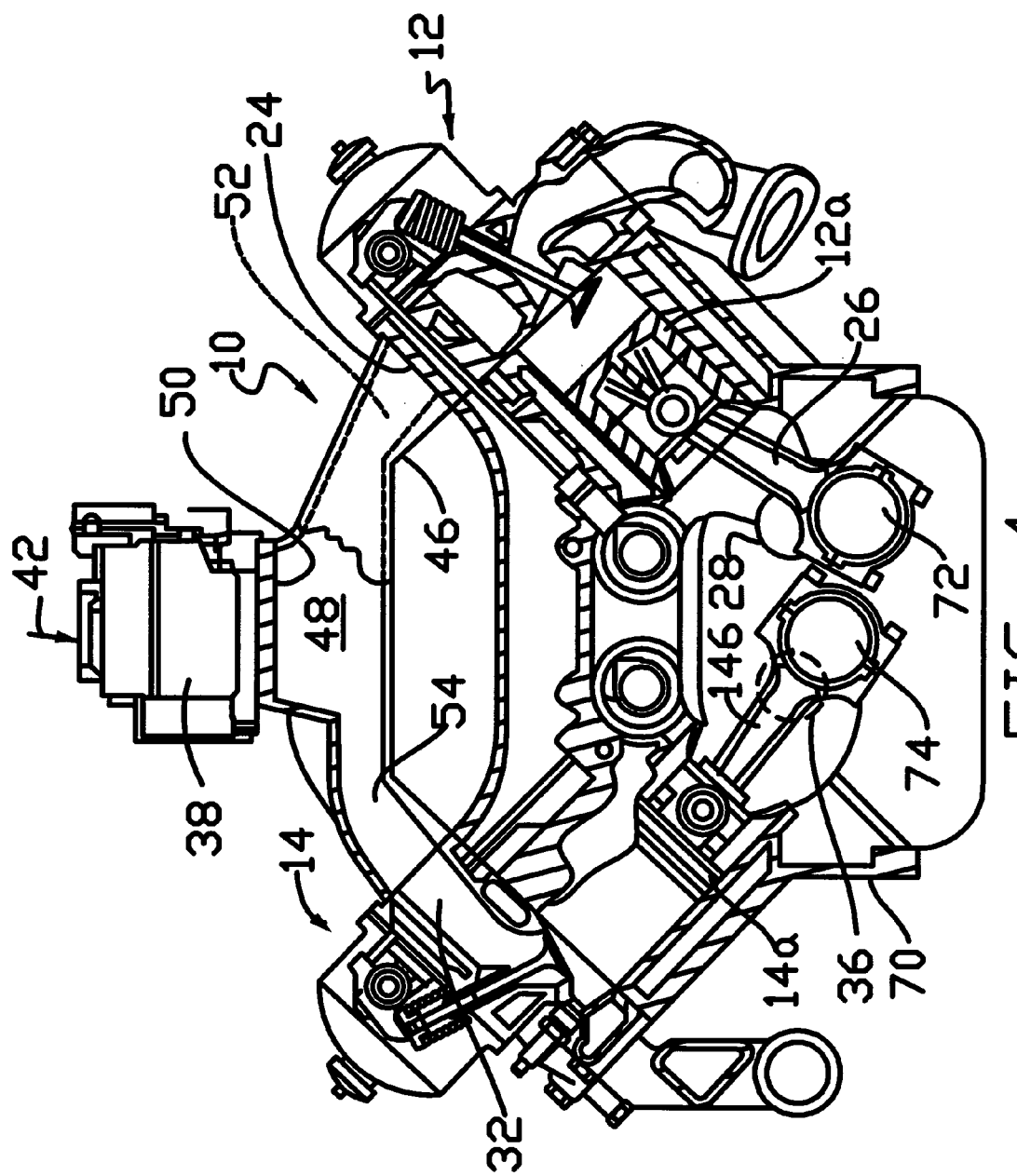
FIG. 4 is a cross section of an alternate embodiment of a multi-engine power plant, according to the invention, having a first and a second engine module housed in a common engine block.

It is also not necessary that the first and second engine modules 12, 14 be physically separate entities. FIG. 4 shows an embodiment of the invention in which the first engine module 12 and second engine module 14 share a common engine block 70 and form a V-shaped multi-engine power plant 10, that is very similar in outside appearance to a typical V-shaped engine. In the multi-engine power plant 10 of the embodiment shown in FIG. 4, however, each of the engine modules 12, 14 has its own separate crankshaft 72, 74. The pistons 12a, of the first engine module 12 are connected by connecting rods 12b to only the crankshaft 72 of the first engine module 12, and the pistons 14a, of the first engine module 14 are connected by connecting rods 14b to only the crankshaft 74 of the second engine module 14. The output shafts 28, 36 of the first and second engine modules 12, 14 are respectively connected to the crankshafts 72, 74 of the first and second engine modules 12, 14, to provide torque outputs that are coupled together in the same manner described above in relation to the embodiment shown in FIG. 1.

The power plant 10 of FIG. 4 includes a single throttle body 38 for controlling the flow of air 42 to the intakes 24, 32 of the first and second engine modules 12, 14, respectively, at a common MAP, via an inlet manifold 46 defining a common internal plenum 48, having an inlet 50 for receiving the flow of air 42 from the throttle body 38, outlets 52 for delivering a portion of the flow of air 42 to the intakes 24 of the first engine module 12, and outlets 54 for delivering the remainder of the flow of air 42 to the intakes 32 of the second engine module 14, in the same manner as described above in relation to the embodiment of FIG. 1.

The power plant 10 of FIG. 4 also utilizes throttle body fuel injection (not shown), as is known in the art, instead of the multi-point fuel injection utilized in the first exemplary power plant embodiment 10 of FIG. 1. Multi-point fuel injection could be utilized instead of throttle body injection in the embodiment of FIG. 4, and throttle body fuel injection could be used in the embodiment of FIG. 1, but multi-point fuel injection would be preferred in most instances.

It will be further appreciated that the first and second engine modules 12, 14 and second clutch 20 of the second exemplary embodiment of the invention, shown schematically in FIG. 3, can also be combined into a single engine block 70, in a manner similar to that illustrated in FIG. 4 and described above.

It will be further understood that the term engine module as used herein encompasses separate, stand alone engines, and that the term power plant is intended to include an engine having multiple engine modules 12, 14, with or without the first and second clutches 18, 20, transmission 16 and gear train 30. A power plant, according to the invention, may also be utilized in conjunction with an electric motor in a hybrid vehicle.

The scope of the invention is indicated in the appended claims, and all changes or modifications within the meaning and range of equivalents are intended to be embraced therein.

I claim:

1. A multi-engine power plant comprising:
   a first internal combustion engine module having an air intake and an output shaft for delivering a torque output of the first engine module;
   a second internal combustion engine module having an air intake and an output shaft for delivering an output torque of the second engine module; and
   an apparatus for controlling the multi-engine power plant, the apparatus including a single throttle body operatively connected to the air intakes of both the first and second engine modules, for controlling a flow of air to the intakes of the engine modules at a common manifold absolute pressure (MAP) of both engine modules during operation of one or both of the engine modules.

2. The multi-engine power plant of claim 1, further comprising a first fuel control system operatively connected to the first engine module for controlling a flow of fuel to the first engine module independently from a flow of fuel to the second engine module, and a second fuel control system operatively connected to the second engine module for controlling the flow of fuel to the second engine module independently from the flow of fuel to the first engine module.

3. The multi-engine power plant of claim 1, further comprising a first ignition control system operatively connected to the first engine module for controlling ignition in the first engine module independently from ignition in the second engine module, and a second ignition control system operatively connected to the second engine module for controlling ignition in the second engine module independently from ignition in the first engine module.

4. The multi-engine power plant of claim 1, further comprising a selectively engagable clutch for operatively coupling the output shaft of the second engine module to output shaft of the first engine module.

5. The multi-engine power plant of claim 4, further comprising a transmission operatively couplable to both the first and second engine modules for selectively receiving torque output from the output shafts of one or both of the first and second engine modules.

6. The multi-engine power plant of claim 1, further comprising a controller operatively connected to the throttle body for controlling the flow of air through the throttle body.

7. The multi-engine power plant of claim 6 wherein the controller is adapted for receiving an input indicating a desired torque output of the power plant, and controls the flow of air through the throttle body as a function of the desired torque output.

8. The multi-engine power plant of claim 7 wherein:
   the power plant further comprises a selectively engagable clutch for operatively coupling the output shaft of the second engine module to output shaft of the first engine module; and
   the controller controls the flow of air through the throttle body as a function of whether the output shaft of the second engine module is operatively coupled to the output shaft of the first engine module.

9. The multi-engine power plant of claim 8 wherein the controller controls engagement of the selectively engagable clutch as a function of the desired torque output of the power plant.

10. The multi-engine power plant of claim 7 wherein the controller controls the flow of air through the throttle body according to a first function of desired torque output from the power plant when only the first engine module is operating, and controls the flow of air through the throttle body according to a second unction of desired torque output when both the first and second engine modules are operating.

11. The multi-engine power plant of claim 10 wherein:
    the power plant further comprises a selectively engagable clutch for operatively coupling the output shaft of the second engine module to the output shaft of the first engine module, to thereby couple together the torque outputs of the first and second engine modules; and
    the controller controls airflow through the throttle body according to a third function of desired torque output from the power plant when a rotational speed of the output shaft of the second engine module does not substantially match a rotational speed of the output shaft of the first engine.

12. The multi-engine power plant of claim 11 wherein the second engine module is started by coupling its output shaft to the output shaft of the first engine while the first engine module is operating.

13. A method for operating a multi-engine power plant, where the power plant includes a first internal combustion engine module having an air intake and an output shaft for delivering power, and a second internal combustion engine module having an air intake and an output shaft for delivering power, the method comprising:
    controlling a flow of air to the intakes of the engine modules at a common manifold absolute pressure (MAP) of both engine modules during operation of one or both of the engine modules with a single throttle body operatively connected to the air intakes of both the first and second engine modules.

14. The method of claim 13, further comprising, controlling a flow of fuel to the first engine module independently from a flow of fuel to the second engine module, and controlling a flow of fuel to the second engine module independently from a flow of fuel to the first engine module.

15. The method of claim 13, further comprising, controlling ignition in the first engine module independently from ignition in the second engine module, and controlling ignition in the second engine module independently from ignition in the first engine module.

16. The method of claim 13, further comprising, selectively operatively coupling the output shaft of the second engine module to the output shaft of the first engine module.

17. The method of claim 16, further comprising, controlling the flow of air through the throttle body as a function of whether the output shaft of the second engine module is operatively coupled to the output shaft of the first engine module.

18. The method of claim 13, further comprising, controlling the flow of air through the throttle body as a function of a desired torque output of the power plant.

19. The method of claim 17, further comprising, selectively coupling the output shaft of the second engine module to the output shaft of the first engine module as a function of the desired torque output of the power plant.

20. The method of claim 18, further comprising controlling the flow of air through the throttle body according to a first function of desired torque output from the power plant when only the first engine module is operating, and controlling airflow through the throttle body according to a second function of desired torque output when both the first and second engine modules are operating.

21. The method of claim 20, further comprising:
    selectively operatively coupling the output shaft of the second engine module to the output shaft of the first engine nodule such that the torque outputs of the output shafts of the first and second engine modules are coupled together; and controlling airflow through the throttle body according to a third function of desired torque output from the power plant when a speed of the second engine module does not substantially match a speed of the fist engine module.

22. The method of claim 21, further comprising, starting the second engine module by coupling its output shaft to the output shaft of the first engine module while the first engine module is operating.

23. An apparatus for controlling a multi-engine power plant, where the power plant includes a first internal combustion engine module having an air intake and an output shaft for delivering power, and a second internal combustion engine module having an air intake and an output shaft for delivering power, the apparatus comprising:

a single throttle body having an inlet for receiving a flow of air, and an outlet operatively connected to the air intakes of both the first and second engine modules for delivering the flow of air to the intakes of the engine modules at a common manifold absolute pressure (MAP) of both engine modules during operation of one or both of the engine modules.

24. The apparatus of claim 23 further comprising a controller operatively connected to the throttle body for controlling the flow of air through the throttle body.

25. The apparatus of claim 23, further comprising, an inlet manifold defining a common internal plenum having an inlet for receiving the flow of air from the throttle body, a first outlet for delivering a portion of the flow of air from the common internal plenum to the intake of the first engine module, and a second outlet for delivering a remainder of the flow of air from the common internal plenum to the intake of the second engine module.

* * * * *